United States Patent
Ando

(10) Patent No.: US 7,932,854 B2
(45) Date of Patent: Apr. 26, 2011

(54) AZIMUTH DETECTING APPARATUS AND RADAR APPARATUS

(75) Inventor: Takamasa Ando, Gifu (JP)

(73) Assignee: Denso Corporation, Kariya (JP)

( * ) Notice: Subject to any disclaimer, the term of this patent is extended or adjusted under 35 U.S.C. 154(b) by 84 days.

(21) Appl. No.: 12/455,900

(22) Filed: Jun. 9, 2009

(65) Prior Publication Data

US 2009/0303107 A1  Dec. 10, 2009

(30) Foreign Application Priority Data

Jun. 10, 2008  (JP) ................... 2008-151669

(51) Int. Cl.
*G01S 13/42* (2006.01)
*G01S 13/93* (2006.01)

(52) U.S. Cl. ............. 342/70; 342/71; 342/72; 342/133; 342/139; 342/146; 342/147

(58) Field of Classification Search ............. 342/70–72, 342/90, 107–108, 111, 113, 116, 133, 139, 342/146–147, 156
See application file for complete search history.

(56) References Cited

U.S. PATENT DOCUMENTS

| | | | |
|---|---|---|---|
| 4,780,722 A | 10/1988 | Cusdin | |
| 5,361,072 A * | 11/1994 | Barrick et al. | 342/133 |
| 5,712,644 A | 1/1998 | Kolak | |
| 7,148,840 B2 * | 12/2006 | Dooi et al. | 342/131 |
| 7,545,310 B2 * | 6/2009 | Matsuoka | 342/70 |
| 7,639,178 B1 * | 12/2009 | Mulbrook et al. | 342/146 |
| 2003/0052813 A1 * | 3/2003 | Natsume | 342/70 |
| 2007/0103360 A1 * | 5/2007 | Nakanishi | 342/70 |
| 2008/0186223 A1 * | 8/2008 | Mayer et al. | 342/109 |
| 2008/0291088 A1 | 11/2008 | Nagai | |
| 2009/0303105 A1 * | 12/2009 | Ando | 342/123 |

FOREIGN PATENT DOCUMENTS

| | | |
|---|---|---|
| JP | 62-289781 | 12/1987 |
| JP | 08-181537 | 7/1996 |
| JP | 11-002678 | 1/1999 |
| JP | 2000-230974 | 8/2000 |

(Continued)

OTHER PUBLICATIONS

Office Action dated Apr. 13, 2010 in Japanese Application No. 2008-151669 with English translation thereof.

(Continued)

*Primary Examiner* — John B Sotomayor
(74) *Attorney, Agent, or Firm* — Harness, Dickey & Pierce, PLC

(57) ABSTRACT

In an azimuth detecting apparatus, a receiver includes a plurality of first antenna elements and a second antenna element. The first antenna elements are arranged at first intervals d1 to form an array. The second antenna element is arranged to define a second interval d2 between itself and one of the first antenna elements which is located at an end of the array, where d2 is less than d1. A first azimuth detector detects, within a first azimuth detection area whose angular range is defined by d1, the azimuth of a target based on the signals generated by all the first antenna elements. A second azimuth detector detects, within a second azimuth detection area whose angular range is defined by d2, the azimuth of the target based on the signals generated by the second antenna element and the first antenna element located at the end of the array.

8 Claims, 7 Drawing Sheets

FOREIGN PATENT DOCUMENTS

| | | |
|---|---|---|
| JP | 2000-258524 | 9/2000 |
| JP | 2003-066133 | 3/2003 |
| JP | 2003-240832 | 8/2003 |
| JP | 2008-045880 | 2/2008 |
| WO | WO 2006/009122 | 1/2006 |
| WO | WO2007/083479 | 7/2007 |

OTHER PUBLICATIONS

Office Action dated Dec. 14, 2010, in corresponding Japanese Application No. 2008-151669, and English translation thereof.

* cited by examiner

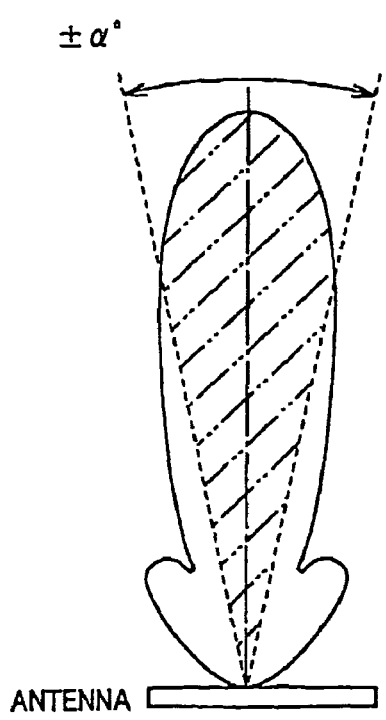
FIG.6A
CONVENTIONAL
DETECTION AREA
WIDE DETECTION AREA
COMBINED
DETECTION AREA

AZIMUTH DETECTING APPARATUS AND RADAR APPARATUS

CROSS-REFERENCE TO RELATED APPLICATION

This application is based on and claims priority from Japanese Patent Application No. 2008-151669, filed on Jun. 10, 2008, the content of which is hereby incorporated by reference in its entirety into this application.

BACKGROUND OF THE INVENTION

1. Technical Field of the Invention

The present invention relates to an azimuth detecting apparatus that detects the azimuth of a target by sending and receiving continuous waves, and to a radar apparatus that employs the azimuth detecting apparatus.

2. Description of the Related Art

Conventionally, a radar apparatus is installed in a motor vehicle to detect the presence of a target (for example, a roadside object such as a guardrail or a preceding vehicle) by sending and receiving continuous waves (i.e., radar waves).

More specifically, to detect the azimuth of the target and thereby determine the position of the target, the radar apparatus employs an array antenna as a receiving antenna. The array antenna is configured by, for example as disclosed in Japanese Patent First Publication No. H8-181537, arranging a plurality of antenna elements at predetermined equal intervals.

Since the radar apparatus is installed in the vehicle that usually runs at high speed, it is required for the radar apparatus to be capable of detecting the azimuth of a target present at a distant location (for example, away from the vehicle by 100 to 200 m). Further, to meet this requirement, the antenna elements are generally so arranged as to narrow the beamwidth of the array antenna (i.e., sharpen the main lobe of the array antenna).

Consequently, the angular range of an azimuth detection area of the radar apparatus becomes narrow. Here, the azimuth detection area is defined such that the radar apparatus can detect the azimuth of a target only when the target is located in the area. In addition, hereinafter, the narrow angular range is to be referred to as conventional angular range, and the azimuth detection area with the narrow angular range is to be referred to as conventional azimuth detection area. As a result, it is difficult for the radar apparatus to detect, in an early stage, another vehicle cutting in front of the vehicle from the side.

Accordingly, it is desired for the radar apparatus to have a wider angular range of the azimuth detection area than the conventional angular range while keeping the capability of detecting the azimuth of a distant target.

To meet the above desire, one may consider configuring the receiving antenna with both a first array antenna having a plurality of antenna elements equally spaced at first intervals and a second array antenna having a plurality of antenna elements equally spaced at second intervals that are narrower than the first intervals.

However, with the above configuration, the receiving antenna would be enlarged, resulting in an increase in the manufacturing cost. On the other hand, the space in the vehicle available for installation of the radar apparatus is generally limited, and it is thus undesirable to enlarge the receiving antenna.

SUMMARY OF THE INVENTION

The present invention has been made in view of the above-mentioned problems.

According to one aspect of the present invention, there is provided an azimuth detecting apparatus which includes a transmitter, a receiver, a first azimuth detector, and a second azimuth detector. The transmitter transmits a continuous wave. The receiver includes a plurality of first antenna elements and a second antenna element. Each of all the first and second antenna elements is configured to generate a signal upon receipt of a reflected continuous wave that is produced by the reflection of the continuous wave by a target. The first antenna elements are arranged at first intervals d1 to form an array of the first antenna elements. The second antenna element is arranged to define a second interval d2 between itself and one of the first antenna elements which is located at an end of the array of the first antenna elements, where d2 is less than d1. The first azimuth detector detects, within a first azimuth detection area whose angular range is defined by d1, the azimuth of the target based on the signals generated by all the first antenna elements. The second azimuth detector detects, within a second azimuth detection area whose angular range is defined by d2, the azimuth of the target based on the signals generated by the second antenna element and the one of the first antenna elements which is located at the end of the array and defines the second interval d2 together with the second antenna element.

With the above configuration, the azimuth detecting apparatus can detect the azimuth of the target both within the first azimuth detection area and within the second azimuth detection area. Moreover, with d2 being less than d1, the angular range of the second azimuth detection area is wider than the angular range of the first azimuth detection area, whereas the maximum length of the first azimuth detection area is longer than the maximum length of the second azimuth detection area.

In addition, compared to a conventional azimuth detecting apparatus which includes the same number and arrangement of the first antenna elements as described above, it becomes possible for the azimuth detecting apparatus to detect the azimuth of the target within the second azimuth detection area as well as within the first azimuth detection area only by adding the second antenna element to the first antenna elements. In other words, it becomes possible to enhance the azimuth detection capability of the azimuth detecting apparatus while suppressing increase in the size of the receiver.

In the above azimuth detecting apparatus, the second azimuth detector may detect the azimuth of the target based on at least one of the phase difference and amplitude difference between the signals generated by the second antenna element and the one of the first antenna elements which is located at the end of the array and defines the second interval d2 together with the second antenna element.

In the above azimuth detecting apparatus, each of the first antenna elements may be a compound antenna element that is formed by combining a plurality of antenna elements.

It is preferable for the above azimuth detecting apparatus to be used in a motor vehicle. In this case, the azimuth detecting apparatus would be able to detect, in an early stage, another vehicle cutting in front of the vehicle from the side as well as being able to accurately detect the azimuth of a distant object.

According to another aspect of the present invention, there is provided a radar apparatus which includes a transmitter, a receiver, a first azimuth detector, a second azimuth detector, a first range detector, a second range detector, and a target identifier. The transmitter transmits a continuous wave. The receiver includes a plurality of first antenna elements and a second antenna element. Each of all the first and second antenna elements is configured to generate a signal upon receipt of a reflected continuous wave that is produced by the reflection of the continuous wave by a target. The first antenna elements are arranged at first intervals d1 to form an array of the first antenna elements. The second antenna element is arranged to define a second interval d2 between itself and one of the first antenna elements which is located at an end of the array of the first antenna elements, where d2 is less than d1. The first azimuth detector detects, within a first azimuth detection area whose angular range is defined by d1, the azimuth of the target based on the signals generated by all the first antenna elements. The second azimuth detector detects, within a second azimuth detection area whose angular range is defined by d2, the azimuth of the target based on the signals generated by the second antenna element and the one of the first antenna elements which is located at the end of the array and defines the second interval d2 together with the second antenna element. The first range detector detects the range of the target based on the signals generated by all the first antenna elements. The second range detector detects the range of the target based on the signals generated by the second antenna element and the one of the first antenna elements. The target identifier identifies the target based on both the azimuth of the target detected by one of the first and second azimuth detectors and the range of the target detected by one of the first and second range detectors.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 6A is a schematic view illustrating a conventional azimuth detection area;

DESCRIPTION OF PREFERRED EMBODIMENT

Figure 1:
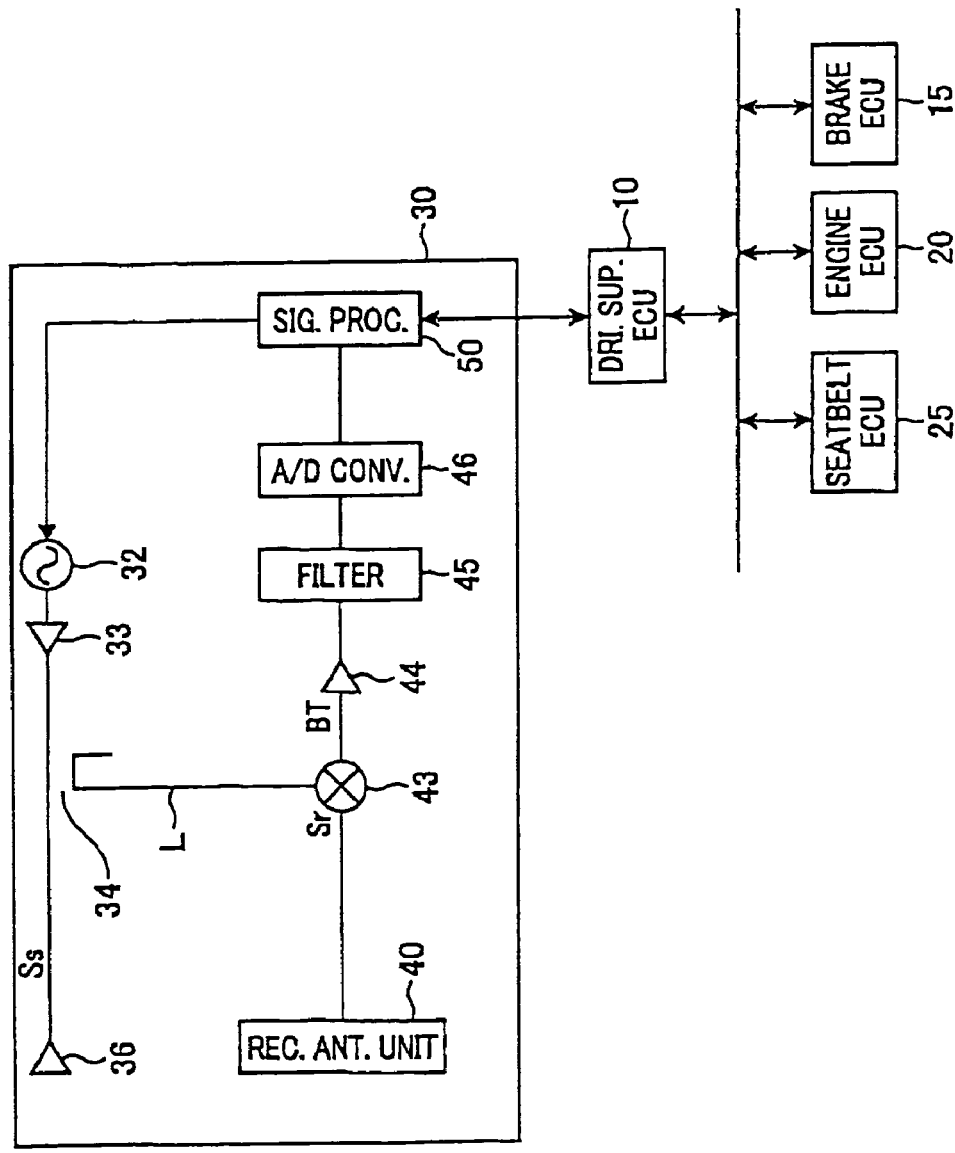
FIG. 1 is a schematic view showing the overall configuration of a driving support system which includes a radar sensor according to the preferred embodiment of the invention.

FIG. 1 shows the overall configuration of a driving support system 1 which includes a radar sensor 30 according to a preferred embodiment of the invention.

The driving support system 1 is installed in a front portion of a motor vehicle. The radar sensor 30, which detects objects present in front of the vehicle, is connected to a driving support ECU (Electronic Control Unit) 10. The driving support ECU 10 is further connected, via a LAN communication bus, to each of a brake ECU 15, an engine ECU 20, and a seatbelt ECU 25.

Each of the ECUs 10, 15, 20, and 25 is configured mainly with a microcomputer which includes a CPU, a ROM, and a RAM.

Each of the ECUs 10, 15, 20, and 25 also includes a bus controller for performing communication via the LAN communication bus.

The radar sensor 30 is configured as an EHF Extremely High Frequency) radar apparatus of FMCW (Frequency-Modulated Continuous Wave) type. The radar sensor 30 recognizes a target (e.g., a preceding vehicle or a roadside guardrail) by sending and receiving frequency-modulated continuous waves within the EHF band. Further, the radar sensor 30 produces target information on the recognized target, and outputs to the driving support ECU 10 a signal that indicates the produced target information. In addition, the target information includes, for example, the position (i.e., both the range and azimuth) of the target and the relative speed of the target to the vehicle.

The brake ECU 15 determines the state of a brake of the vehicle based on signals output from a steering angle sensor (not shown), a yaw rate sensor (not shown), and a master cylinder pressure sensor (not shown), and outputs to the driving support ECU 10 a signal that indicates the determined state of the brake. Further, the brake ECU 15 receives, from the driving support ECU 10, a signal that indicates, for example, a desired acceleration of the vehicle and a brake command. Then, based on the determined state of the brake and the signal received from the driving support ECU 10, the brake ECU 15 controls the braking force applied to the vehicle by controlling pressure-increasing and pressure-reducing valves (not shown) included in a hydraulic circuit of the vehicle.

The engine ECU 20 determines the operating condition of an engine of the vehicle based on signals output from a vehicle speed sensor (not shown), a throttle position sensor (not shown), and an accelerator position sensor (not shown), and outputs to the driving support ECU 10 a signal that indicates the determined operating condition of the engine. Further, the engine ECU 20 receives, from the driving support ECU 10, a signal that indicates, for example, the desired acceleration of the vehicle and a fuel-cut command. Then, based on the determined operating condition of the engine and the signal received from the driving support ECU 10, the engine ECU 20 controls the driving force of the engine by controlling a throttle valve of the engine.

The seatbelt ECU 25 controls, upon receipt of a warning signal from the driving support ECU 10, the restraining force of a seatbelt of the vehicle by controlling a servomotor (not shown); the warning signal warns that a collision of the vehicle with the target is inevitable.

In addition, though not shown in the drawings, a warning buzzer, a monitor, a cruise control switch, and a desired vehicle-to-vehicle distance setting switch are also connected to the driving support ECU 10.

The driving support ECU 10 performs a control for keeping a suitable distance between the vehicle and the preceding vehicle, based on the target information produced by the radar sensor 30 and parameters set by the cruise control switch and the desired vehicle-to-vehicle distance setting switch. More specifically, the driving support ECU 10 outputs to the engine ECU 20 the signal that indicates the desired acceleration and the fuel-cut command, and to the brake ECU 15 the signal that indicates the desired acceleration and the brake command.

Moreover, the driving support ECU 10 determines the probability of occurrence of a collision between the vehicle and the target based on the target information received from the radar sensor 30. When the determined probability is higher than a predetermined value, the driving support ECU 10 outputs the brake command to the brake ECU 15 to increase the braking force, and the warning signal to the seatbelt ECU 25 to increase the restraining force of the seatbelt.

That is to say, in the present embodiment, the driving support system 1 functions both as an ACC (Auto Cruise Control) system to keep a suitable distance between the vehicle and the preceding vehicle based on the target information produced by the radar sensor 30 and as a PCS (Pre-Crash Safety) system to control both the braking force and the restraining force of the seatbelt based on the target information produced by the radar sensor 30.

After having described the overall configuration of the driving support system 1, the configuration and operation of the radar sensor 30 will be described hereinafter.

The radar sensor 30 includes an oscillator 32, an amplifier 33, a signal splitter 34, a transmitting antenna 36, a receiving antenna unit 40, a mixer 43, an amplifier 44, a filter 45, an A/D (Analog-to-Digital) converter 46, and a signal processor 50.

The oscillator 32 generates an EHF signal that is frequency-modulated to have uphill intervals and downhill intervals; in the uphill intervals, the frequency of the signal increases linearly with time; in the downhill intervals, the frequency decreases linearly with time.

The amplifier 33 amplifies the EHF signal generated by the oscillator 32. The signal splitter 34 splits the EHF signal amplified by the amplifier 33 into a transmission signal Ss and a local signal L. The transmitting antenna 36 radiates a radar wave (i.e., a continuous wave) corresponding to the transmission signal Ss.

The receiving antenna unit 40 receives a radar echo (or a reflected radar wave), which is produced by the reflection of the radar wave by a target, and outputs to the mixer 43 a reception signal Sr corresponding to the received radar echo.

The mixer 43 mixes the reception signal Sr output from the receiving antenna unit 40 with the local signal L, producing a beat signal BT. The amplifier 44 amplifies the beat signal BT produced by the mixer 43. The filter 45 filters the beat signal BT amplified by the amplifier 44, thereby removing unnecessary components from the beat signal BT. The A/D converter 46 converts the beat signal BT filtered by the filter 45 into a digital signal.

The signal processor 50 is configured mainly with a microcomputer which includes a CPU, a ROM, and a RAM. The signal processor 50 controls the activation and deactivation of the oscillator 32; it also controls the conversion of the beat signal BT into the digital signal. Moreover, the signal processor 50 processes the digital signal output from the A/D converter 46, and performs a target detection process which is to be described later.

Figure 2:
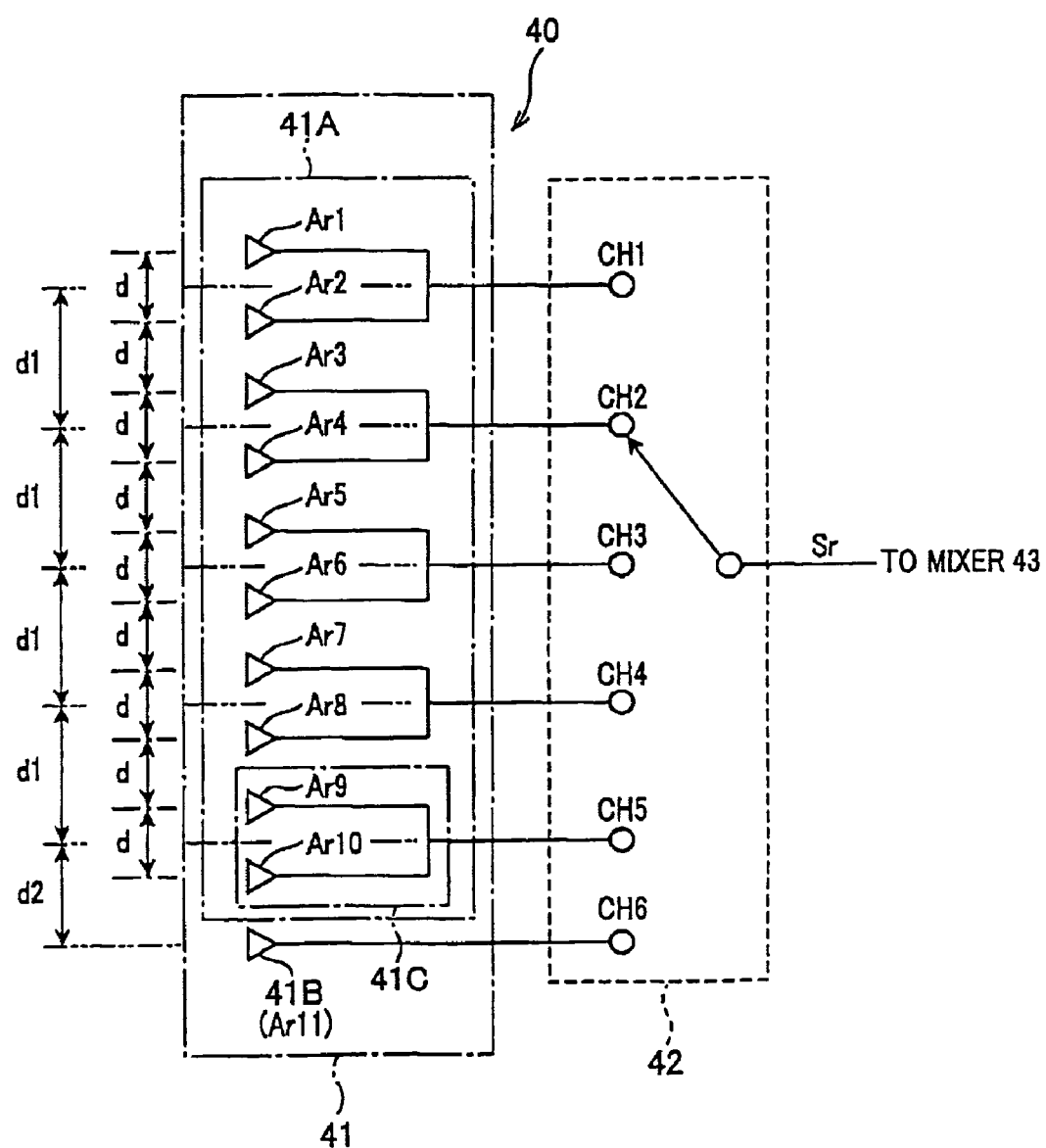
FIG. 2 is a schematic view showing the overall configuration of a receiving antenna unit of the radar sensor.

FIG. 2 shows the overall configuration of the receiving antenna unit 40 of the radar sensor 30.

As shown in FIG. 2, the receiving antenna unit 40 includes an antenna element group 41 and a reception switch 42. The antenna element group 41 consists of (n+1) antenna elements Ari (i=1, 2, . . . , n+1), where n is an integer greater than or equal to 2. In addition, in the present embodiment, n=10. Each of the antenna elements Ari is configured to generate a signal upon receipt of the radar echo. The reception switch 42 includes p reception channels CHj (j=1, 2, . . . , p), where p is an integer greater than or equal to 2. In addition, in the present embodiment, p=6. Each of the reception channels CHj is connected to one or two of the antenna elements Ari. The reception switch 42 sequentially selects one of the reception channels CHj at each time, thereby outputting, as the reception signal Sr, a signal produced by the one or two of the antenna elements Ari connected to the selected reception channel CHj to the mixer 43.

Specifically, in the antenna element group 41, n antenna elements Ar1 through Arn are arranged at predetermined intervals d, forming an array antenna 41A. The remaining antenna element Ar(N+1) (i.e., Ar11 in the present embodiment) makes up a specific antenna element 41B. Further, the array antenna 41A includes (n/m) compound antenna elements each of which is formed by combining adjacent m of the antenna elements Ar1 through Arn, where m is an integer greater than or equal to 2. In addition, in the present embodiment, m=2.

More specifically, in the present embodiment, the antenna elements Ar1 and Ar2 are combined together to form a first compound antenna element. The first compound antenna element produces a first synthetic signal by directly synthesizing in analog form the signals generated by the antenna elements Ar1 and Ar2. Further, the first compound antenna element is connected to the reception channel CH1 of the reception switch 42 to output the first synthetic signal to the reception channel CH1.

The antenna elements Ar3 and Ar4 are combined together to form a second compound antenna element. The second compound antenna element produces a second synthetic signal by directly synthesizing in analog form the signals generated by the antenna elements Ar3 and Ar4. Further, the second compound antenna element is connected to the reception channel CH2 of the reception switch 42 to output the second synthetic signal to the reception channel CH2.

The antenna elements Ar5 and Ar6 are combined together to form a third compound antenna element. The third compound antenna element produces a third synthetic signal by directly synthesizing in analog form the signals generated by the antenna elements Ar5 and Ar6. Further, the third compound antenna element is connected to the reception channel CH3 of the reception switch 42 to output the third synthetic signal to the reception channel CH3.

The antenna elements Ar7 and Ar8 are combined together to form a fourth compound antenna element. The fourth compound antenna element produces a fourth synthetic signal by directly synthesizing in analog form the signals generated by the antenna elements Ar7 and Ar8. Further, the fourth compound antenna element is connected to the reception channel CH4 of the reception switch 42 to output the fourth synthetic signal to the reception channel CH4.

The antenna elements Ar9 and Ar10 are combined together to form a fifth compound antenna element. The fifth compound antenna element produces a fifth synthetic signal by directly synthesizing in analog form the signals generated by the antenna elements Ar9 and Ar10. Further, the fifth compound antenna element is connected to the reception channel CH5 of the reception switch 42 to output the fifth synthetic signal to the reception channel CH5.

That is to say, in the present embodiment, the array antenna 41A of the receiving antenna unit 40 includes the five compound antenna elements that are arranged in the array direction at first intervals d1, where d1 is twice d (i.e., d1=2d). In addition, among the five compound antenna elements, the fifth compound antenna element, which is made up of the antenna elements Ar9 and Ar10 and located at an end of the array antenna 41A, is to be refereed to as a specific antenna element 41C hereinafter.

Moreover, in the antenna element group 41, the specific antenna element 41B (i.e., the antenna element Ar11 in the present embodiment) is arranged to define a second interval d2 between itself and the specific antenna element 41C, where d2<d1. More specifically, in the present embodiment, the specific antenna element 41B is so arranged that the distance from the center of the specific antenna element 41B to the center of the specific antenna element 41C (i.e., the midpoint between the antenna elements Ar9 and Ar10) is equal to d2. The specific antenna element 41B is connected to the reception channel CH6 of the reception switch 42 to output the signal generated by itself to the reception channel CH6.

In addition, in the present embodiment, the number of the compound antenna elements is equal to (n/m), and each of the compound antenna elements and the specific antenna element 41B is connected to a corresponding one of the reception channels CHj. Therefore, the number p of the reception channels CHj is equal to (n/m+1). More specifically, when n and m are respectively equal to 10 and 2, p is equal to 6.

The radar sensor 30 with the above configuration operates in the following way.

First, the oscillator 32 oscillates under control of the signal processor 50, thereby generating the EHF signal. The EHF signal is then amplified by the amplifier 33, and split by the signal splitter 34 into the transmission signal Ss and the local signal L. Upon receipt of the transmission signal Ss, the transmitting antenna 36 radiates the radar wave that corresponds to the transmission signal Ss.

Further, when the radar wave is reflected by a target, the radar echo (i.e., the reflected radar wave) is transmitted back to the radar sensor 30, and received by all the antenna elements Ari (i=1, 2, . . . , n+1). However, the reception switch 42 of the receiving antenna unit 40 sequentially selects only one of the reception channels CHj (j=1, 2, . . . , p) at each time. Consequently, only the signal output from that one of the compound antenna elements and the specific antenna element 41B which is connected to the selected channel CHj is output to the mixer 43 as the reception signal Sr. The mixer 43 mixes the reception signal Sr with the local signal L, producing the beat signal BT. The beat signal BT is then amplified by the amplifier 44, filtered by the filter 45, and converted by the A/D converter 46 into the digital signal. The digital signal is output to the signal processor 50. Then, the signal processor 50 processes the digital signal to produce the target information. Thereafter, the signal processor 50 outputs to the driving support ECU 10 the signal that indicates the produced target information.

In addition, in the present embodiment, the reception switch 42 of the receiving antenna unit 40 switches the reception channels CHj G=1, 2, . . . , p) in such a manner that during each frequency-modulation cycle of the radar wave, each of the reception channels CHj is selected a predetermined number of times (e.g., 1024 times). Further, in converting the beat signal BT into the digital signal, the A/D converter 46 samples the beat signal BT in sync with the switching of the reception channels CHj by the reception switch 42. Consequently, for each of the uphill and downhill intervals in each frequency-modulation cycle of the radar wave, the beat signal BT is sampled a predetermined number of times (e.g., 512 times) for each of the reception channels CHj.

Figure 3:
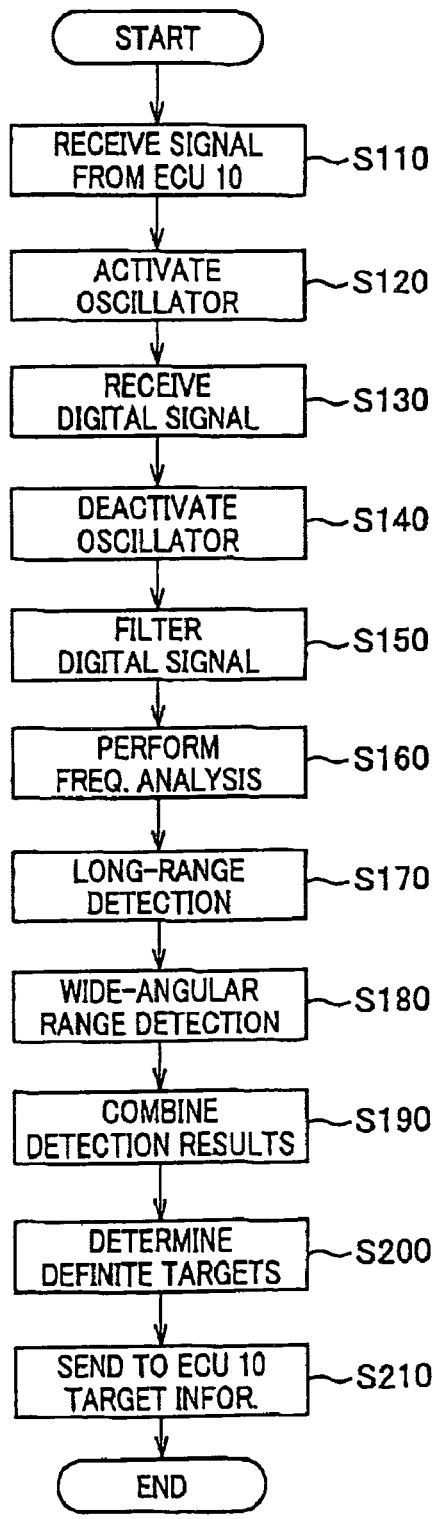
FIG. 3 is a flow chart illustrating a target detection process of a signal processor of the radar sensor.

FIG. 3 shows the target detection process of the signal processor 50. This process is started upon activation of the radar sensor 30, and repeated at predetermined time intervals. In addition, the radar sensor 30 is activated upon turning on an ignition switch of the vehicle.

First, at step S110, the signal processor 50 receives a signal from the driving support ECU 10. The signal indicates, for example, the current running speed of the vehicle and the shape of a front road (e.g., an estimated curve radius R of the front road).

At step S120, the signal processor 50 activates the oscillator 32 to start transmission of the radar wave.

At step S130, the signal processor 50 receives the digital signal output from the A/D converter 46.

At step S140, the signal processor 50 deactivates the oscillator 32 to stop the transmission of the radar wave.

At step S150, the signal processor 50 filters the digital signal with a decimation filter.

At step S160, the signal processor 50 performs a frequency analysis (more particularly, a fast Fourier transform) on the filtered digital signal to obtain a power spectrum (or frequency spectrum) of the beat signal BT for each of the reception channels CHj (j=1, 2, . . . , p) and for each of the uphill and downhill intervals of each frequency-modulation cycle.

Figure 4:
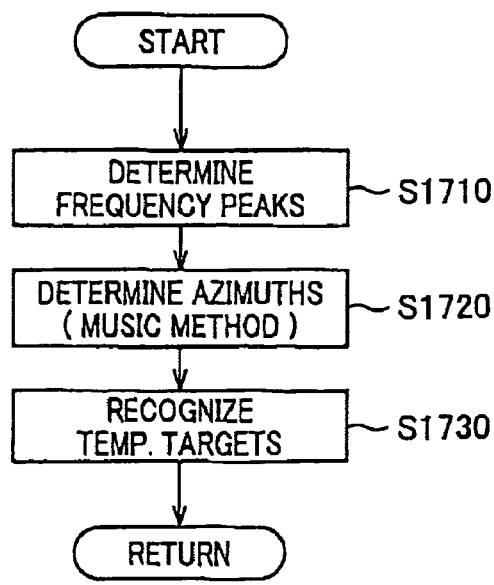
FIG. 4 is a flow chart illustrating a long-range detection sub-process of the target detection process.

At step S170, the signal processor 50 performs a long-range detection sub-process which is shown in FIG. 4.

Referring now to FIG. 4, at step S1710, the signal processor 50 first selects part of all the power spectrums obtained at step S160 of the main process as first spectrums; then, the signal processor 50 determines frequency peaks in the first spectrums; the frequency peaks represent the ranges to target candidates that have reflected the radar wave. In other words, at this step, the signal processor 50 detects target candidates.

Figure 7:
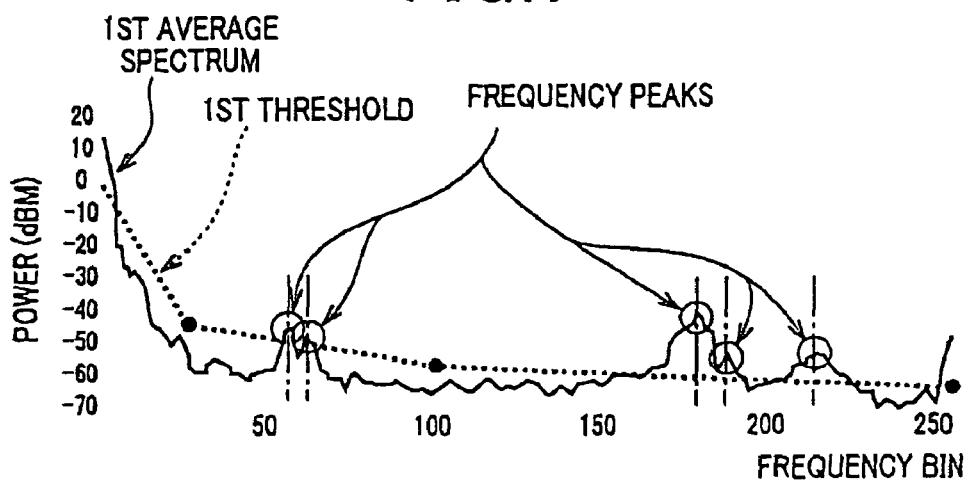
FIG. 7 is a graphical representation illustrating a step of determining frequency peaks in the long-range detection sub-process.

More specifically, in the present embodiment, among all the power spectrums obtained at step S160 of the main process, the signal processor 50 selects only those power spectrums which are obtained based on the reception signals Sr output from the reception channels CH1 through CH5 as the first spectrums; the reception channels CH1 through CH5 are respectively connected to the first through fifth compound antenna elements that are equally spaced at the first intervals d1. Further, the signal processor 50 computes first average spectrums by averaging all the first spectrums. Then, the signal processor 50 determines local maximum points in the first average spectrums, which exceed a predetermined first threshold, as the frequency peaks. In addition, in the present embodiment, the first threshold is so predetermined as to decrease with frequency. For example, FIG. 7 illustrates one of the first average spectrums, where there are five local maximum points each of which exceeds the first threshold and thus represents one of the frequency peaks.

At succeeding step S1720, the signal processor 50 determines, based on the first spectrums obtained at step S1710, the azimuths of the target candidates detected at step S1710.

Figure 8A:
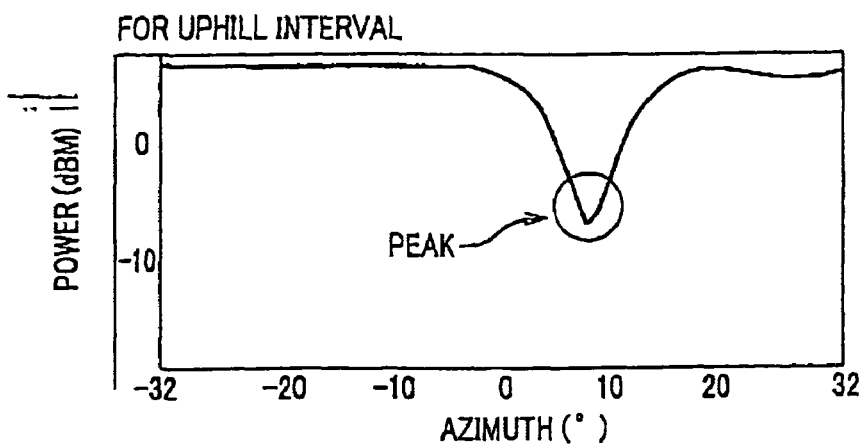
FIGS. 8A and 8B are schematic views illustrating MUSIC (Multiple Signal Classification) spectrums obtained in the long-range detection sub-process.
Figure 8B:
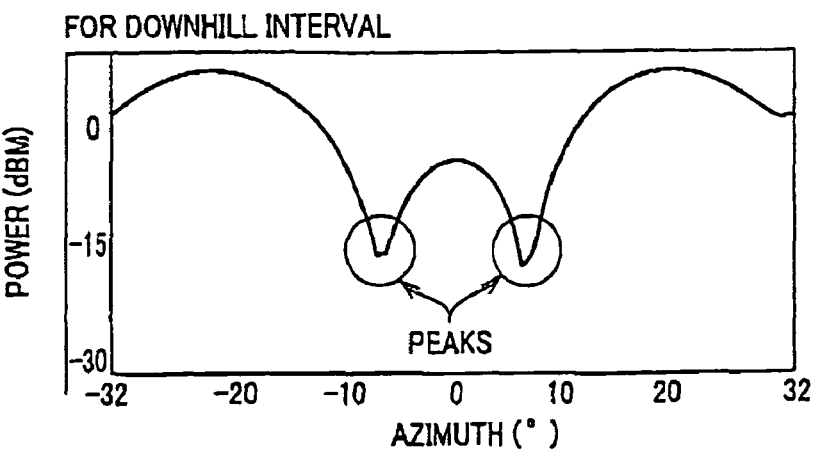

More specifically, in the present embodiment, the signal processor 50 determines the azimuths of the target candidates using a well-known MUSIC (Multiple Signal Classification) method in which MUSIC spectrums are produced from the first spectrums. For example, FIGS. 8A and 8B respectively illustrate MUSIC spectrums produced for the uphill and downhill intervals of one frequency-modulation cycle. In addition, the peaks in the MUSIC spectrums are indicative of the azimuths of the target candidates.

At step S1730, the signal processor 50 recognizes temporary targets and produces target information on the recognized temporary targets.

More specifically, in the present embodiment, the signal processor 50 matches the frequency peaks which are determined at step S1710 based on the first average spectrums for the uphill intervals of the frequency-modulation cycles with those which are determined at step S1710 based on the first average spectrums for the downhill intervals of the frequency-modulation cycles. Further, the signal processor 50 determines, for each of the matched pairs of the frequency peaks, whether the differences in power and azimuth between the matched pair are within respective allowable ranges; if the result of the determination is affirmative (i.e., YES), then the signal processor 50 recognizes a temporary target which is indicated by the matched pair of the frequency peaks. Furthermore, the signal processor 50 produces target information on each of the recognized temporary targets; the target information includes both the range and azimuth of the temporary target.

Moreover, in the present embodiment, the first intervals d1 are so predetermined as to be identical to intervals at which antenna elements of a conventional radar sensor are arranged. Consequently, as shown in FIG. 6A, by performing the long-range detection sub-process, the azimuth detection area of the radar sensor 30 becomes identical to the conventional azimuth detection area, and the angular range of the azimuth detection area (designated by ±α° in FIG. 6A) becomes identical to the conventional angular range. As a result, it is possible for the radar sensor 30 to detect a target at a long range from the vehicle.

Figure 5:
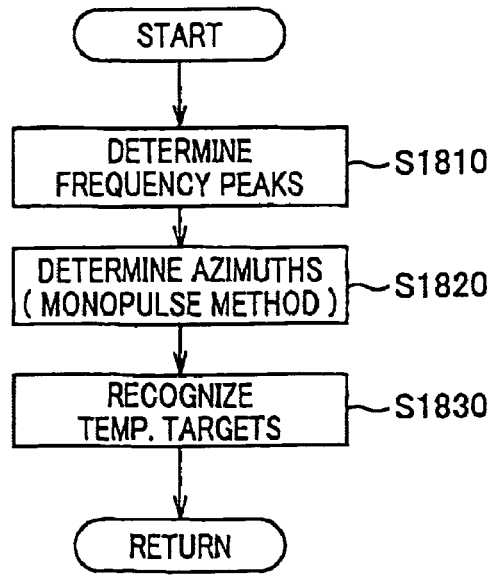
FIG. 5 is a flow chart illustrating a wide-angular range detection sub-process of the target detection process.

Returning to the main process (i.e., the target detection process) shown in FIG. 3, at step S180, the signal processor 50 performs a wide-angular range detection sub-process which is shown in FIG. 5.

Referring now to FIG. 5, at step S1810, the signal processor 50 first selects part of all the power spectrums obtained at step S160 of the main process as second spectrums; then, the signal processor 50 determines frequency peaks in the second spectrums; the frequency peaks represent the ranges to target candidates that have reflected the radar wave. In other words, at this step, the signal processor 50 detects target candidates.

More specifically, in the present embodiment, among all the power spectrums obtained at step S160 of the main process, the signal processor 50 selects only those power spectrums which are obtained based on the reception signals Sr output from the reception channels CH5 and CH6 as the second spectrums; the reception channels CH5 and CH6 are respectively connected to the specific antenna element 41C (i.e., the fifth compound antenna element made up of the antenna elements Ar9 and Ar10) and the specific antenna element 41B (i.e., the antenna element Ar11). Further, the signal processor 50 computes second average spectrums by averaging all the second spectrums. Then, the signal processor 50 determines local maximum points in the second average spectrums, which exceed a predetermined second threshold, as the frequency peaks.

At step S1820 of FIG. 5, the signal processor 50 determines the azimuths of the target candidates detected at step S1810 using a well-known monopulse method.

More specifically, according to the monopulse method, the signal processor 50 determines the azimuths of the target candidates based on at least one of the phase difference and amplitude difference between the reception signal Sr output from the specific antenna element 41C via the reception channel CH5 and that output from the specific antenna element 41B via the reception channel CH6.

At step S1830, the signal processor 50 recognizes temporary targets and produces target information on the recognized temporary targets.

More specifically, in the present embodiment, the signal processor 50 matches the frequency peaks which are determined at step S1810 based on the second average spectrums for the uphill intervals of the frequency-modulation cycles with those which are determined at step S1810 based on the second average spectrums for the downhill intervals of the frequency-modulation cycles. Further, the signal processor 50 determines, for each of the matched pairs of the frequency peaks, whether the differences in power and azimuth between the matched pair are within respective allowable ranges; if the result of the determination is affirmative (i.e., YES), then the signal processor 50 recognizes a temporary target which is indicated by the matched pair of the frequency peaks. Furthermore, the signal processor 50 produces target information on each of the recognized temporary targets; the target information includes both the range and azimuth of the temporary target.

Figure 6B:
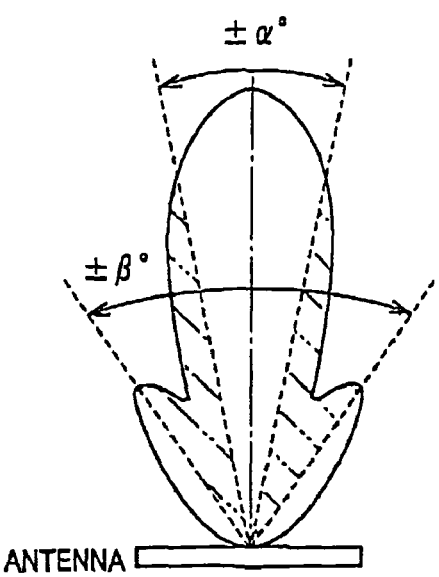
FIG. 6B is a schematic view illustrating a wide azimuth detection area of the radar sensor.

Moreover, in the present embodiment, the specific antenna elements 41B and 41C are spaced at the second interval d2 which is less than the first intervals d1. Consequently, as shown in FIG. 6B, by performing the wide-angular range detection sub-process, the maximum length of the azimuth detection area of the radar sensor 30 becomes shorter than that of the conventional azimuth detection area; however, the angular range of the azimuth detection area (designated by ±β° in FIG. 6B) becomes considerably wider than the conventional angular range (i.e., β>α). In addition, the azimuth detection area with the wider angular range is to be referred to as wide azimuth detection area hereinafter.

Returning to the main process (i.e., the target detection process) shown in FIG. 3, at step S190, the signal processor 50 combines the results of the long-range detection sub-process with those of the wide-angular range detection sub-process.

Figure 6C:
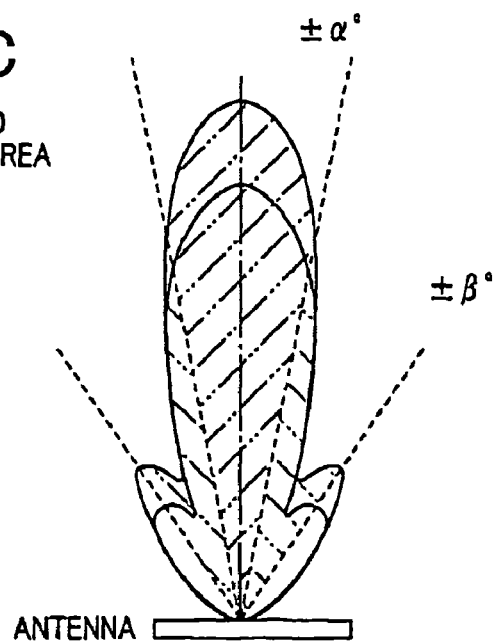
FIG. 6C is a schematic view illustrating a combined azimuth detection area which is the union of the conventional azimuth detection area and the wide azimuth detection area.

More specifically, in the present embodiment, the signal processor 50 superposes the wide azimuth detection area shown in FIG. 6B on the conventional azimuth detection area shown in FIG. 6A, obtaining a combined azimuth detection area as shown in FIG. 6C. Here, the combined azimuth detection area represents the union of the conventional azimuth detection area and the wide azimuth detection area. Further, among the set of the temporary targets recognized by the wide-angular range detection sub-process, the signal processor 50 adds only those temporary targets which fall out of the intersection of the wide and conventional azimuth detection areas to the set of the temporary targets recognized by the long-range detection sub-process, resulting in a combined set of the temporary targets. Here, the combined set of the temporary targets represents the union of the set of the temporary targets recognized by the long-range detection sub-process and the set of the temporary targets recognized by the wide-angular range detection sub-process.

At succeeding step S200, the signal processor 50 determines definite targets among the combined set of the temporary targets.

More specifically, in the present embodiment, the signal processor 50 first matches the combined set of the temporary targets obtained in the current cycle of the repeated executions of the target detection process with that obtained in the previous cycle. Then, for each matched pair of the temporary targets, the signal processor 50 estimates, based on the target information on the temporary target recognized in the previous cycle, both the position and relative speed of the temporary target in the current cycle; further, when the difference between the estimated position and the actual position of the temporary target recognized in the current cycle and the difference between the estimated relative speed and the actual relative speed of the temporary target recognized in the current cycle are less than respective upper limits, the signal processor 50 determines that the matched pair of the temporary targets have a historical connection. Furthermore, the signal processor 50 determines, for each of the combined set of the temporary targets recognized in the current cycle, whether the temporary target has kept the historical connection over more than a predetermined number of consecutive cycles; if the result of the determination is affirmative (i.e., YES), then the signal processor 50 determines the temporary target as a definite target.

Figure 9:
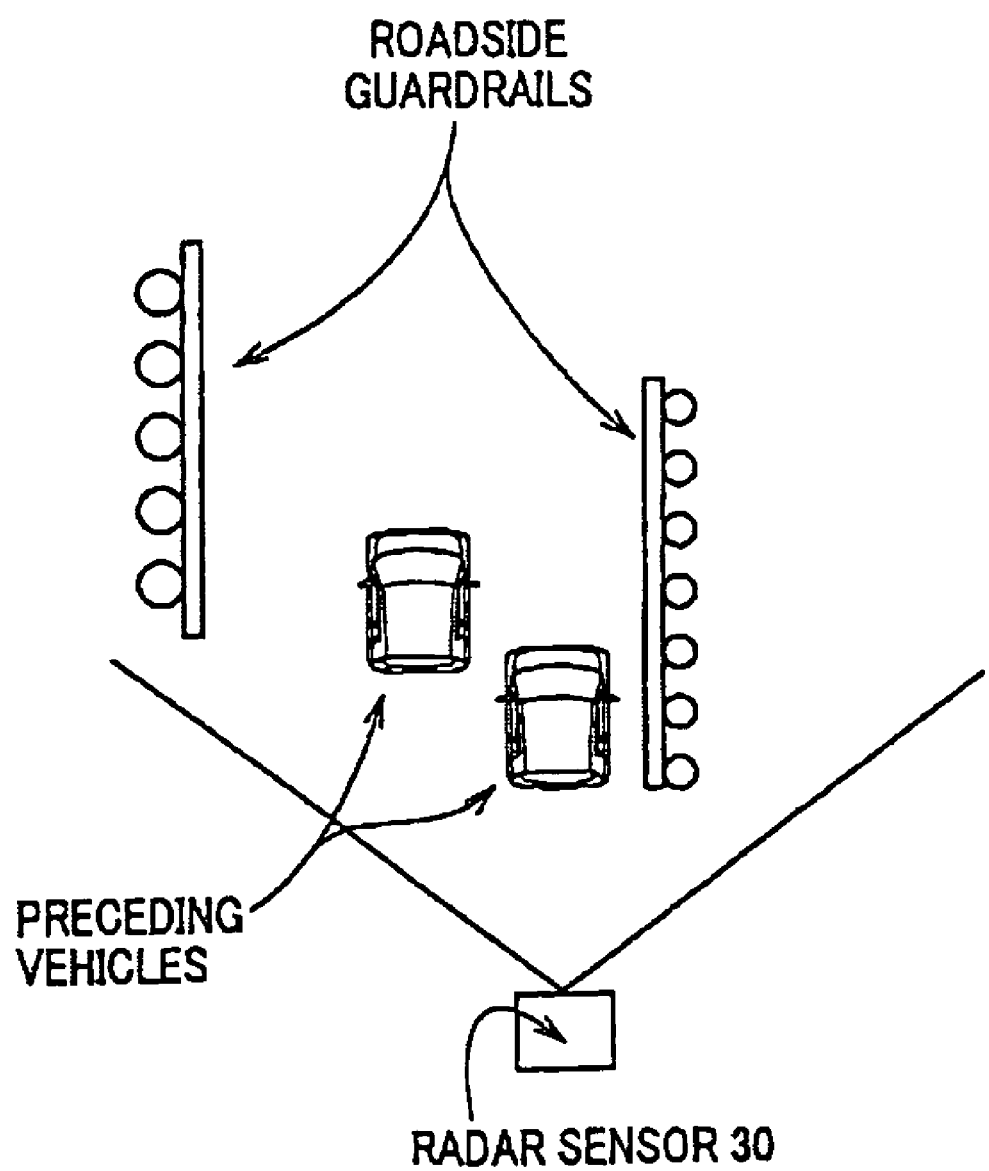
FIG. 9 is a schematic view illustrating objects identified by the radar sensor.

In addition, at this step, the signal processor 50 further identifies, based on the positions and relative speeds of the definite targets, objects present within the combined azimuth detection area, for example roadside guardrails and preceding vehicles as illustrated in FIG. 9.

At step S210, the signal processor 50 sends the target information on the definite targets to the driving support ECU 10.

After that, the target detection process goes to the end. In other words, the signal processor 50 completes the current cycle of repeating the target detection process.

As described above, in the radar sensor 30 according to the present embodiment, the receiving antenna unit 40 includes the array antenna 41A and the specific antenna element 41B. The array antenna element 41A is configured by arranging the compound antenna elements at the first intervals d1. The specific antenna element 41B is arranged to define the second interval d2 between itself and one of the compound antenna elements which is located at an end of the array antenna 41A (i.e., the specific antenna element 41C), where d2 is less than d1.

The signal processor 50 produces the first spectrums based on the reception signals Sr output from the compound antenna elements. Then, the signal processor 50 determines, based on the first spectrums, the azimuths and ranges of temporary targets within the conventional azimuth detection area whose angular range (i.e., $\pm\alpha°$ in FIG. 6A) is defined by d1.

Further, the signal processor 50 produces the second spectrums based on the reception signals Sr output from the specific antenna elements 41B and 41C. Then, the signal processor 50 determines, based on the second spectrums, the azimuths and ranges of temporary targets within the wide azimuth detection area whose angular range (i.e., $\pm\beta°$ in FIG. 6B) is defined by d2.

Furthermore, the signal processor 50 combines the set of the temporary targets recognized by the long-range detection sub-process with the set of the temporary targets recognized by the wide-angular range detection sub-process, determines the definite targets among the combined set of the temporary targets, and identifies objects within the combined azimuth detection area based on the positions and relative speeds of the definite targets.

With the above configuration, the radar sensor 30 can detect targets within the wide azimuth detection area as well as within the conventional azimuth detection area. The angular range of the wide azimuth detection area is wider than the angular range of the conventional azimuth detection area, whereas the maximum length of the conventional azimuth detection area is longer than the maximum length of the wide azimuth detection area. Consequently, the radar sensor 30 can detect, in an early stage, another vehicle cutting in front of the vehicle from the side as well as being able to accurately detect the position of a distant target.

In addition, compared to a conventional radar sensor which includes the same array antenna 41A as the radar sensor 30, it becomes possible for the radar sensor 30 to detect targets within the wide azimuth detection area as well as within the conventional azimuth detection area only by adding the specific antenna element 41C to the array antenna 41A. In other words, it becomes possible to enhance the target detection capability of the radar sensor 30 while suppressing increase in the size of the receiving antenna unit 40.

While the above particular embodiment of the invention has been shown and described, it will be understood by those skilled in the art that various modifications, changes, and improvements may be made without departing from the spirit of the invention.

For example, in the previous embodiment, the receiving antenna unit 40 includes the array antenna 41A and the specific antenna element 41B (i.e., Ar(n+1)); the array antenna 41A is configured with the compound antenna elements that are arranged at the first intervals d1; the compound antenna elements are formed by combining the n antenna elements Ar1 through Arn that are arranged at the predetermined intervals d.

Alternatively, the array antenna 41A may be configured directly with the n antenna elements Ar1 through Arn without forming the compound antenna elements; the specific antenna element 41B may be arranged to define the second interval d2 between itself and the antenna element Arm. In this case, it is necessary for the second interval d2 to be set less than the predetermined intervals d.

In the previous embodiment, the MUSIC method is used in the long-range detection sub-process to determine the azimuths of the target candidates. However, instead of the MUSIC method, it is possible to use other methods, such as a DBF (Digital Beam Forming) method.

In the previous embodiment, the present invention is applied to the radar sensor 30 which is employed in the driving support system 1 that functions both as an ACC (Auto Cruise Control) system and a PCS (Pre-Crash Safety) system. However, the present invention may also be applied to any other radar apparatus employed in any other vehicle safety system, such as a FCW (Forward Collision Warning) system or LCW (Lane Change Warning) system.

What is claimed is:

1. An azimuth detecting apparatus comprising:
    a transmitter that transmits a continuous wave;
    a receiver including a plurality of first antenna elements and a second antenna element, each of all the first and second antenna elements being configured to generate a signal upon receipt of a reflected continuous wave that is produced by the reflection of the continuous wave by a target, the first antenna elements being arranged at first intervals d1 to form an array of the first antenna elements, the second antenna element being arranged to define a second interval d2 between itself and one of the first antenna elements which is located at an end of the array of the first antenna elements, where d2 is less than d1;
    a first azimuth detector that detects, within a first azimuth detection area whose angular range is defined by d1, the azimuth of the target based on the signals generated by all the first antenna elements; and
    a second azimuth detector that detects, within a second azimuth detection area whose angular range is defined by d2, the azimuth of the target based on the signals generated by the second antenna element and the one of the first antenna elements which is located at the end of the array and defines the second interval d2 together with the second antenna element.

2. The azimuth detecting apparatus as set forth in claim 1, wherein the second azimuth detector detects the azimuth of the target based on at least one of the phase difference and amplitude difference between the signals generated by the second antenna element and the one of the first antenna elements which is located at the end of the array and defines the second interval d2 together with the second antenna element.

3. The azimuth detecting apparatus as set forth in claim 1, wherein each of the first antenna elements is a compound antenna element that is formed by combining a plurality of antenna elements.

4. The azimuth detecting apparatus as set forth in claim 1, wherein the azimuth detecting apparatus is used in a motor vehicle.

5. A radar apparatus comprising:
a transmitter that transmits a continuous wave;
a receiver including a plurality of first antenna elements and a second antenna element, each of all the first and second antenna elements being configured to generate a signal upon receipt of a reflected continuous wave that is produced by the reflection of the continuous wave by a target, the first antenna elements being arranged at first intervals d1 to form an array of the first antenna elements, the second antenna element being arranged to define a second interval d2 between the second antenna element and one of the first antenna elements which is located at an end of the array of the first antenna elements, where d2 is less than d1;
a first azimuth detector that detects, within a first azimuth detection area whose angular range is defined by d1, the azimuth of the target based on the signals generated by all the first antenna elements;
a second azimuth detector that detects, within a second azimuth detection area whose angular range is defined by d2, the azimuth of the target based on the signals generated by the second antenna element and the one of the first antenna elements which is located at the end of the array and defines the second interval d2 together with the second antenna element;
a first range detector that detects the range of the target based on the signals generated by all the first antenna elements;
a second range detector that detects the range of the target based on the signals generated by the second antenna element and the one of the first antenna elements; and
a target identifier that identifies the target based on both the azimuth of the target detected by one of the first and second azimuth detectors and the range of the target detected by one of the first and second range detectors.

6. The radar apparatus as set forth in claim 5, wherein the second azimuth detector detects the azimuth of the target based on at least one of the phase difference and amplitude difference between the signals generated by the second antenna element and the one of the first antenna elements which is located at the end of the array and defines the second interval d2 together with the second antenna element.

7. The radar apparatus as set forth in claim 5, wherein each of the first antenna elements is a compound antenna element that is formed by combining a plurality of antenna elements.

8. The radar apparatus as set forth in claim 5, wherein the radar apparatus is used in a motor vehicle.

* * * * *